(12) United States Patent
Lamba et al.

(10) Patent No.: US 9,152,705 B2
(45) Date of Patent: Oct. 6, 2015

(54) AUTOMATIC TAXONOMY MERGE

(71) Applicant: Wal-Mart Stores, Inc., Bentonville, AR (US)

(72) Inventors: Digvijay Singh Lamba, Sunnyvale, CA (US); Namrata PramodKumar Tholiya, Sunnyvale, CA (US); Omkar Deshpande, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 379 days.

(21) Appl. No.: 13/659,844

(22) Filed: Oct. 24, 2012

(65) Prior Publication Data

US 2014/0114982 A1  Apr. 24, 2014

(51) Int. Cl.
G06F 7/00  (2006.01)
G06F 17/30  (2006.01)

(52) U.S. Cl.
CPC ............................ *G06F 17/30731* (2013.01)

(58) Field of Classification Search
CPC ............................................ G06F 17/30731
USPC ........................................................ 707/748
See application file for complete search history.

(56) References Cited

U.S. PATENT DOCUMENTS

| | | | |
|---|---|---|---|
| 5,768,580 A | 6/1998 | Wical | |
| 5,845,270 A | 12/1998 | Baber | |
| 5,974,424 A * | 10/1999 | Schmuck et al. | 1/1 |
| 6,584,453 B1 * | 6/2003 | Kaplan et al. | 705/39 |
| 6,728,704 B2 | 4/2004 | Mao | |
| 7,162,480 B2 | 1/2007 | Vishik | |
| 7,428,533 B2 | 9/2008 | Kapur | |
| 7,512,576 B1 | 3/2009 | Syeda-Mahmood | |
| 7,620,628 B2 | 11/2009 | Kapur | |
| 7,644,052 B1 | 1/2010 | Chang | |
| 7,974,984 B2 | 7/2011 | Reuther | |
| 8,232,994 B2 | 7/2012 | Aronson | |
| 2003/0126561 A1 | 7/2003 | Faerber | |
| 2005/0131924 A1 | 6/2005 | Jones | |
| 2006/0053099 A1 | 3/2006 | Gardner | |
| 2006/0053175 A1 | 3/2006 | Gardner | |
| 2007/0250487 A1 * | 10/2007 | Reuther | 707/3 |
| 2008/0189265 A1 | 8/2008 | Taranov | |
| 2009/0006472 A1 * | 1/2009 | Bush et al. | 707/104.1 |
| 2009/0037457 A1 | 2/2009 | Musgrove | |
| 2010/0161527 A1 | 6/2010 | Sellamanickam | |
| 2011/0078158 A1 | 3/2011 | Mukherjea | |
| 2012/0185810 A1 * | 7/2012 | Borkam et al. | 716/108 |
| 2013/0060785 A1 | 3/2013 | Sweeney | |
| 2014/0012854 A1 * | 1/2014 | Suprasadachandranpilliai | 707/740 |

FOREIGN PATENT DOCUMENTS

WO  WO0077690 A1  12/2000

* cited by examiner

*Primary Examiner* — Tony Mahmoudi
*Assistant Examiner* — Mohammad Rahman
(74) *Attorney, Agent, or Firm* — Bryan Cave LLP

(57) ABSTRACT

A method for merging two taxonomies is disclosed. Top levels of first and second taxonomies are merged. For the second taxonomy nodes are evaluated and selectively merged with nodes of the first taxonomy according to comparison of scores for these nodes with a threshold. The score for a node of the first taxonomy is a combination of one or more of a lineage quality score, Jaccard distance, string edit distance, and category depth score. After an iteration, mergings between nodes of the first and second taxonomies may be reversed if child nodes of the merged nodes were not likewise merged. Iterations may be repeated until no nodes are merged in an iteration.

22 Claims, 5 Drawing Sheets

AUTOMATIC TAXONOMY MERGE

BACKGROUND

1. Field of the Invention

This invention relates to systems and methods for merging taxonomies into a single taxonomy.

2. Background of the Invention

There are many taxonomies that are in use for various purposes. In many cases a taxonomy is a hierarchical structure with classes that can belong to other classes and entities placed in at least one class. In many cases taxonomies may overlap but may be differently organized. Where the largest possible number of entities and classes is desired then taxonomies may be merged.

The following disclosure provides a novel approach for merging two taxonomies with minimal human input and a high degree of precision.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, the invention has been developed to provide apparatus and methods for merging two taxonomies with human intervention only used to match high-level categories.

Figure 1:
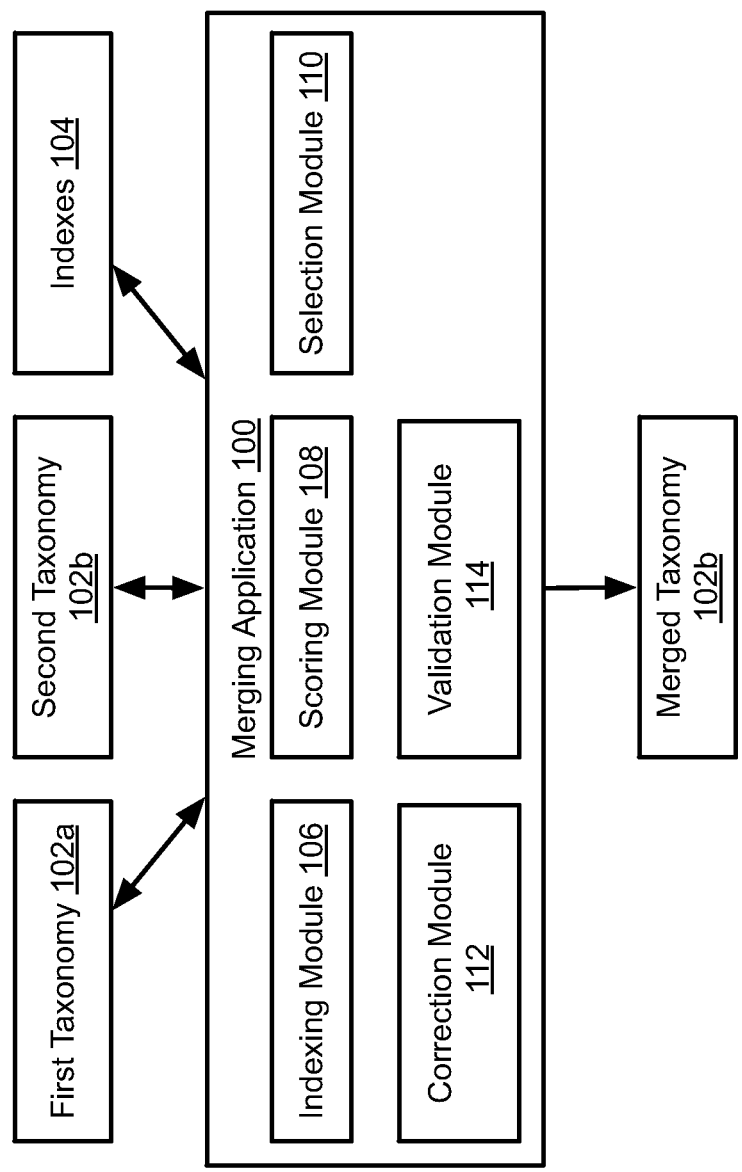
FIG. 1 is a schematic block diagram of a merging application in accordance with an embodiment of the present invention.

Referring to FIG. 1, in some embodiments a merging application 100 may take as inputs two taxonomies 102a-102b. In addition, to facilitate operation of the merging application 100, one or more indexes 104 of one or both of the taxonomies may be generated, as discussed below.

The merging application 100 operates upon the two taxonomies to merge them into a single taxonomy. In one mode of operation, a larger taxonomy (herein referred to as the first taxonomy 102a) is used to incorporate the nodes of a smaller taxonomy (hereinafter the second taxonomy 102b). The indexing module 106 of the merging application 100 indexes the first taxonomy 102a for use in the methods described below. Alternatively, the indexes 104 may already exist such that an indexing module 106 is not used. A scoring module 108 proceeds down the second hierarchy and scores nodes of the second hierarchy according to a plurality of similarity scores described above. A selection module 110 evaluates the scores and matches a node in the second taxonomy 102b to a node in the first taxonomy 102a if the scoring module 108 indicates that a threshold similarity has been met. When scoring similarity of a node in the second taxonomy 102b, the scoring module 108 may use matches made between higher-level nodes in the second taxonomy 102b and nodes of the taxonomy 102a as discussed below.

After an iteration from top to bottom of the second taxonomy including scoring nodes and making appropriate matches, a correction module 112 may evaluate the matches and make corrections. In particular, if a node in the second taxonomy 102b has been matched to a node in the first taxonomy 102a, but a significant portion of the child nodes of the matched nodes were not matched, then the match between the nodes may be undone or removed. After each iteration and correction step, a validation module 114 may evaluate the matchings between the first and second taxonomies 102a, 102b. If it is found that no new matches were made in an iteration, then the validation module 114 may indicate that the merging is complete and end the process. The validation module 114 may further output, store, or otherwise provide the matched taxonomies for subsequent use.

For purposes of this disclosure, the first and second taxonomies 102a-102b may be referred to as a merged taxonomy 102c. The merged taxonomy includes the nodes of the first taxonomy and nodes of the second taxonomy that were not matched to a particular node of the first taxonomy. Accordingly, where a first node in the second taxonomy 102b is matched to a second node in the first taxonomy 102a, but a child node of the first node isn't, the child node will exist in the merged taxonomy as a child of a second node in the first taxonomy.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
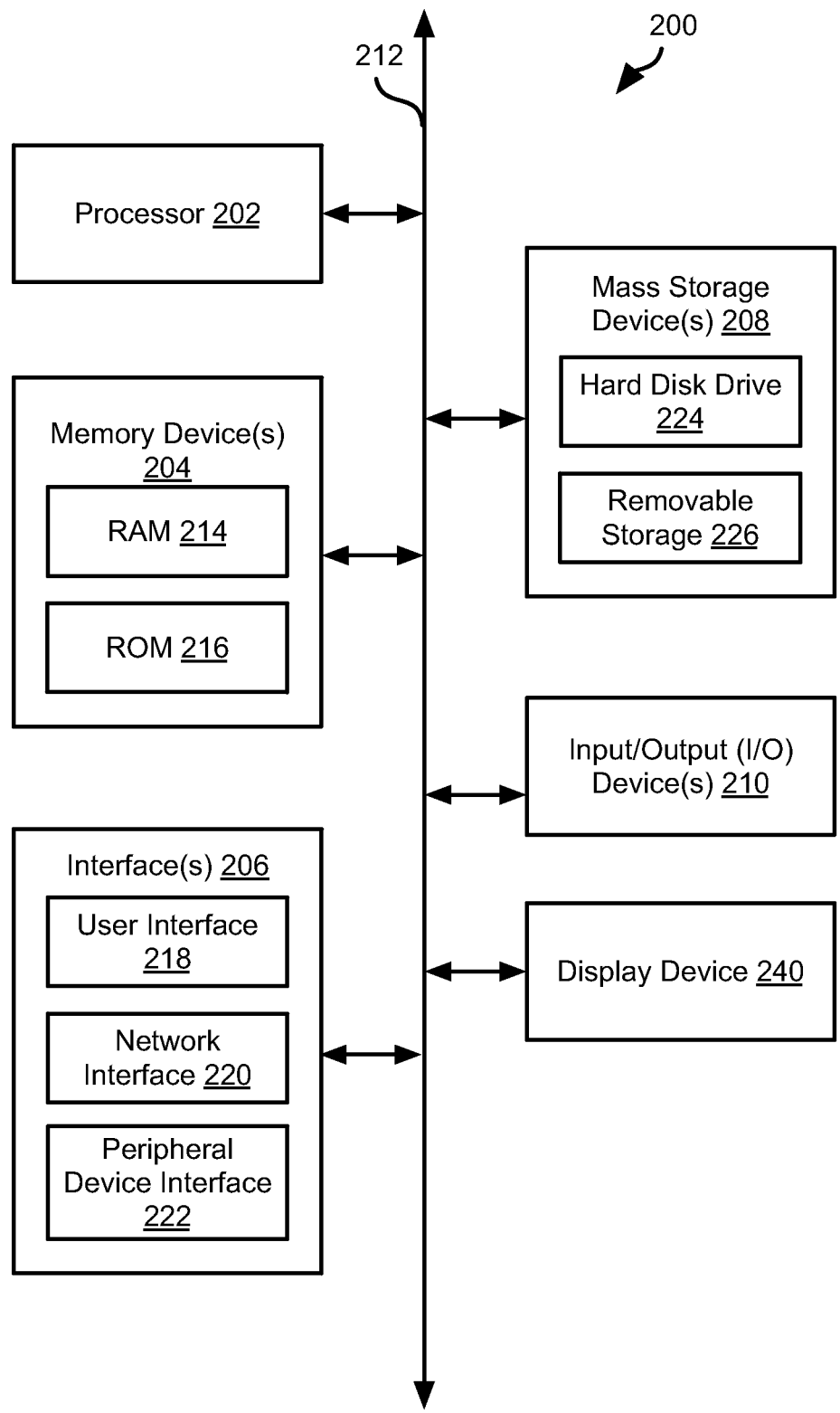
FIG. 2 is a block diagram of a computing device suitable for implementing embodiments of the present invention.

FIG. 2 is a block diagram illustrating an example computing device 200. Computing device 200 may be used to perform various procedures, such as those discussed herein. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
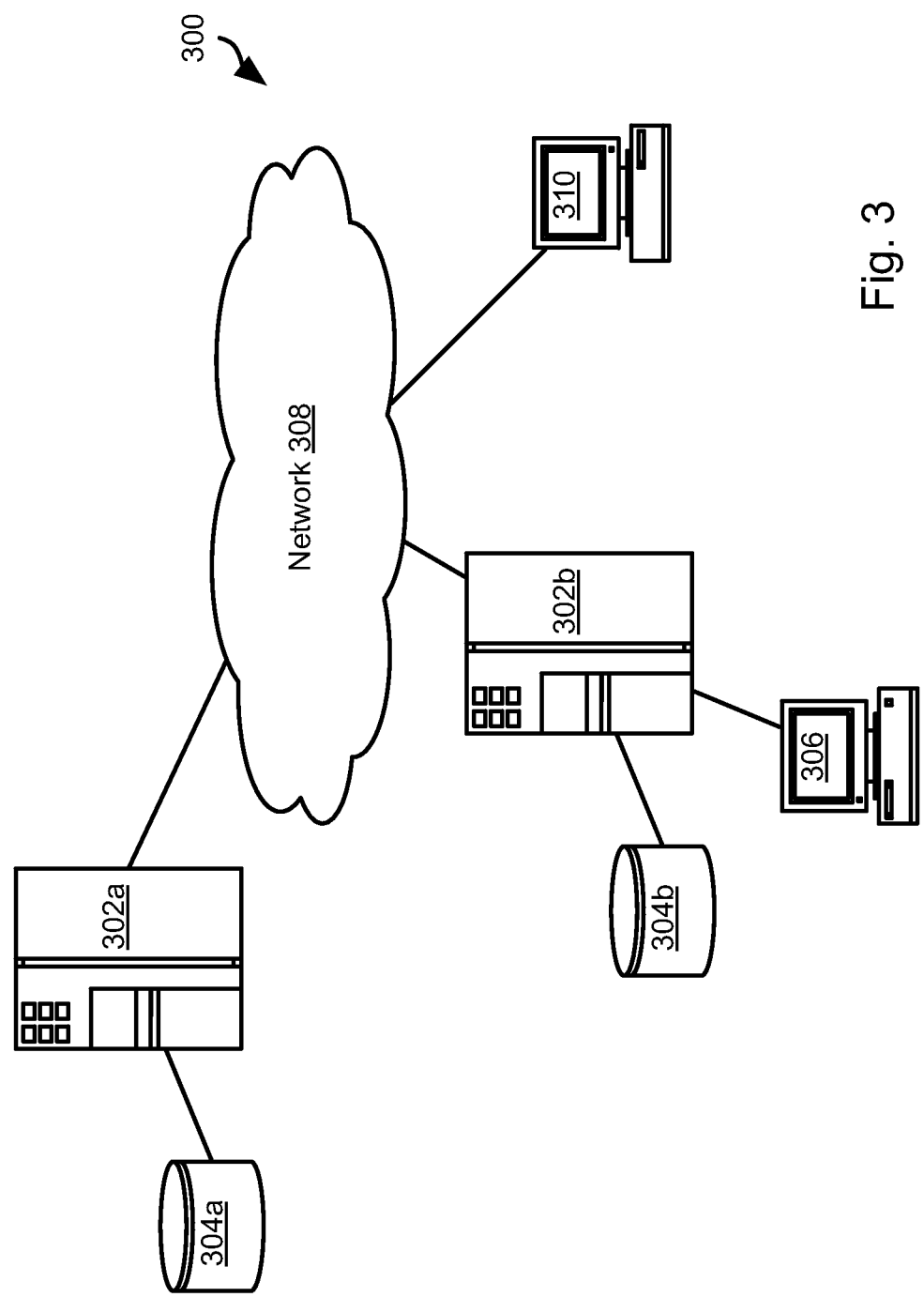
FIG. 3 is a block diagram of a network environment suitable for implementing embodiments of the present invention.

FIG. 3 illustrates an example of a computing environment 300 suitable for implementing the methods disclosed herein.

In some embodiments, a server 302a provides access to a database 304a in data communication therewith. The database 304a may store a directed graph. For example, the database 304a may store the Wikipedia™ corpus or some other corpus of documents hyperlinked to one another to define a directed graph. The server 302a may provide access to the database 304a to various users. For example, the server 302a may implement a web server for receiving requests for data stored in the database 304a and formatting requested information into web pages. The web server may additionally be operable to receive information and store the information in the database 304a. Although a single database 304a and server 302a are shown, the data accessed by users may be distributed across multiple databases 304a and accessed by means of multiple servers 302a.

A server 302b may be associated with another entity providing information services, such as responses to queries for information. The server 302b may be in data communication with a database 304b. The database 304b may store information for use in responding to queries. In particular, the database 304b may store a first taxonomy such as a product catalog or other taxonomy. The database 304b may additionally store a merged taxonomy based on the taxonomy stored on the taxonomy store 304b and a taxonomy stored on the server 304a. In some embodiment, both the directed graph and taxonomy are generated by the same entity and stored and accessed using the same hardware. An operator may access the server 302b by means of a workstation 306, that may be embodied as any general purpose computer, tablet computer, smart phone, or the like.

The server 302a and server 302b may communicate with one another over a network 308 such as the Internet or some other local area network (LAN), wide area network (WAN), virtual private network (VPN), or other network. A user may access data and functionality provided by the servers 302a, 302b by means of a workstation 310 in data communication with the network 308. The workstation 310 may be embodied as a general purpose computer, tablet computer, smart phone or the like. For example, the workstation 310 may host a web browser for requesting web pages, displaying web pages, and receiving user interaction with web pages, and performing other functionality of a web browser. The workstation 310, workstation 306, servers 302a, 302b, and databases 304a, 304b may have some or all of the attributes of the computing device 300.

Figure 4:
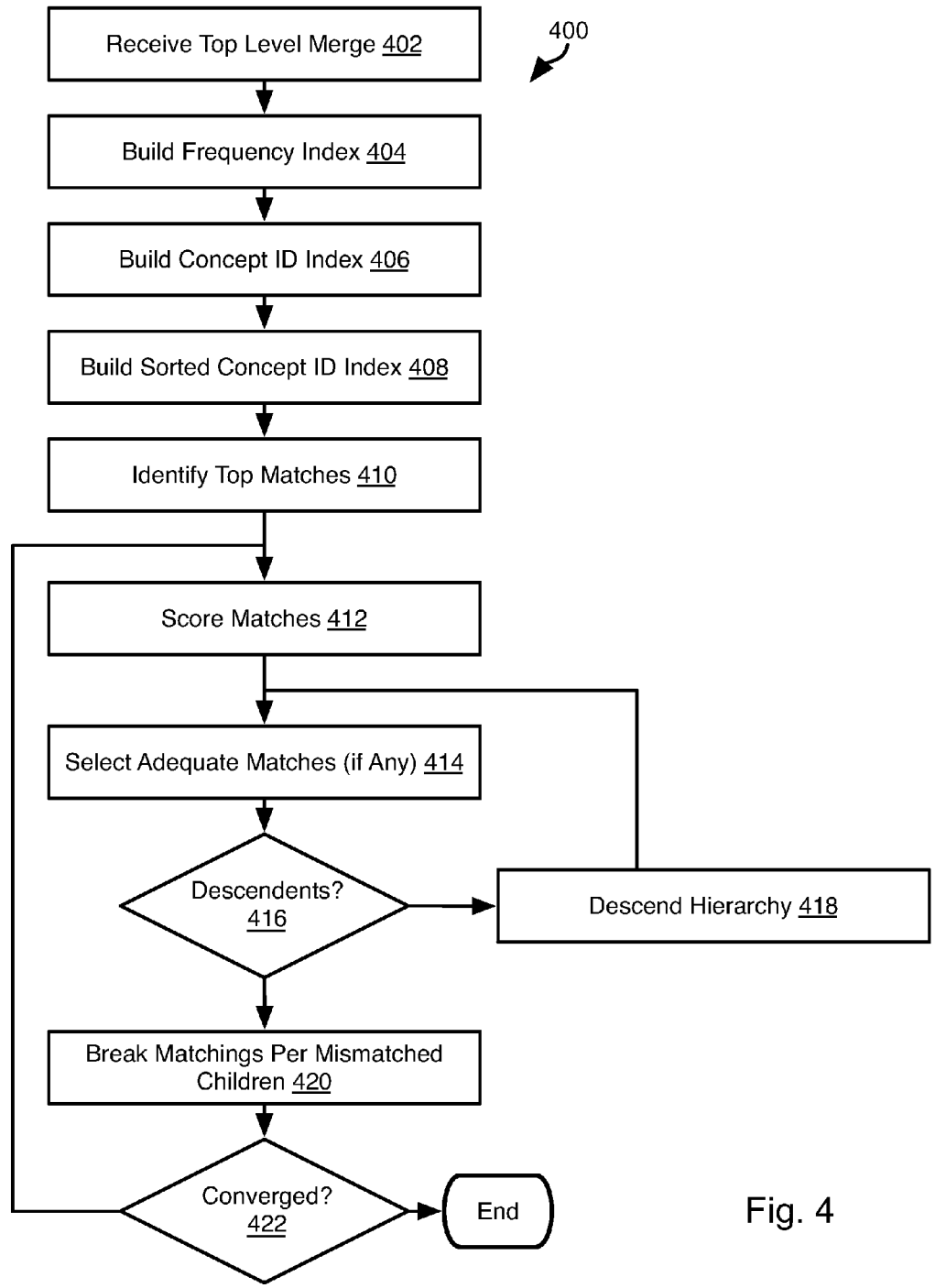
FIG. 4 is a process flow diagram of a method for merging two taxonomies in accordance with an embodiment of the present invention.

FIG. 4 illustrates a method 300 for generating a merged taxonomy from a first and second taxonomies 102a, 102b. The method 400 may include receiving 402 a top level merge. Receiving a top level merge may include receiving matches between one or more top levels of the first taxonomy 102a and the second taxonomy 102b. The matchings may be automatic based on textual or conceptual similarity or may be manually specified by an analyst. As an example, nodes located between two and five levels from a root node in the second taxonomy 102a may each be matched to a corresponding node in the first taxonomy 102b. In some embodiments, rather than selecting nodes to match based on level in the second taxonomy 102b, the N, e.g. 100, largest nodes of the second taxonomy 102b may be matched to nodes of the first taxonomy 102a. The size of a node may be measured as the number of nodes that are descendants of that node in the second taxonomy 102b.

In preparation for future steps in the method 400 one or more index-building steps 404-408 may be performed. For example, frequency index may be build 404, this may include, for each term occurring in the first taxonomy 102a, calculate the number of times the term occurs in the first taxonomy 102a. Accordingly, the frequency index may be a list (sorted alphabetically or by frequency) having as entries a term and a frequency metric, such as the number of times the term occurs in the first taxonomy 102a.

The method 400 may include building 406 a concept identifier index. This may include mapping each term to nodes in the first taxonomy 102a in which the term occurred. Where the first taxonomy 102a includes articles as each node, each article may have a concept identifier or title that is a canonical representation of that concept as well as an article providing information about the concept. Accordingly building 406 a concept identifier index may include mapping each term used in the first taxonomy 102a to the concept identifiers for all articles of the first taxonomy 102a in which the term was used.

The method 400 may also include building 408 a sorted concept identifier index. This may include a list of concept identifiers of the nodes of the first taxonomy 102a sorted high to low according to a frequency metric. The frequency metric indicates a frequency of references to the concept in the first taxonomy. For example, an inverse document frequency (IDF) may be used (Ie.g. a log of a number of articles in first taxonomy 102a divided by the number of articles that reference the concept identifier).

The frequency metric for a concept identifier may also be calculated according to (1), where N is the number of concept identifiers in the first taxonomy, n is a number of words in the concept identifier (e.g. title or name) for a concept, docfreq ($w_i$) is the number of times a word $w_i$ in the concept identifier occurred in a list of all concept identifiers for the first taxonomy.

$$queryidf = \sum_{i=1}^{n} \log \frac{N}{docfreq(w_i) + 1} \quad (1)$$

The method 400 may further include identifying 410, for some or all of the nodes of the second taxonomy 102b, possibly excluding those nodes that have already been merged 402, a top M potential matches from among the concept identifiers of the nodes of the first taxonomy 102a. Identifying 410 matches may include, for each unmatched node of the second taxonomy, identifying M, e.g. 1 to 5 thousand, top potential matches for that node among the nodes of the second taxonomy 102b. Identifying 410 matches may include using any metric for measuring textual similarity, such as a Jaccard distance, string edit distance in the like. For example, in one embodiment, the nodes of the first taxonomy 102a with the top M scores calculated according to (2) for a node in the second taxonomy 102b may be used as potential matches for that node.

$$JaccardScore = \quad (2)$$
$$\sqrt{\frac{common\_words\_idf}{queryidf + conceptidf - common\_words\_idf}} * \frac{common\_words\_idf}{queryidf_i}$$

In (2), queryidf represents the value computed according to (1) for the current node (e.g. the title or concept identifier for the node) in the second taxonomy 102b for which matches are to be identified, conceptidf is the value according to (2) for a selected node in the first taxonomy 102a for which a Jaccard score is to be calculated, and common_words_idf is a value computed according to (1) where the values of $w_i$ are words that are common to both the node of the second taxonomy and the node of the first taxonomy and n is the number of common words.

In some embodiments, indexes may be used, including a reverse index for a word and its IDF frequency (herein widf), a reverse index for word to all the concepts containing this word (word_concepts_match), and reverse index for concept to a concept IDF (cidf). These indexes may be loaded and used for computing a Jaccard score according to (2). This improves performance and saves time. A Jaccard score is computed for words in the current node of the second taxonomy using concept mappings from the word_concepts_match index. Common_words_idf may be a sum of IDFs of common words from the current node of the second taxonomy and a concept obtained from the widf index. In a like manner, queryidf may be a sum of IDF scores of all words in the current node obtained from widf index and conceptidf is a value corresponding to a selected node of the first taxonomy retrieved from cidf.

Figure 5:
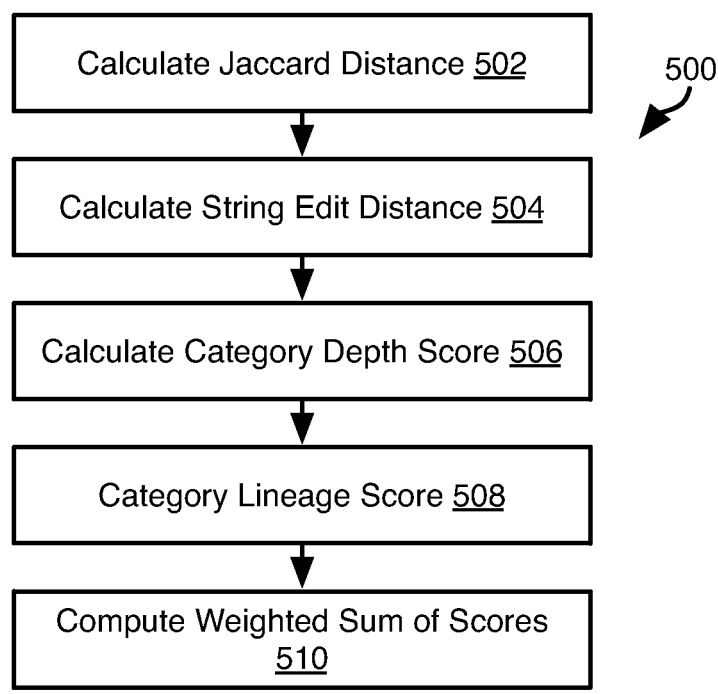
FIG. 5 is a process flow diagram of a method for scoring candidate nodes of one taxonomy for matching to a node of another taxonomy in accordance with an embodiment of the present invention.

Once the top M matches for some or all of the unmatched nodes of the second taxonomy 102b are identified 410, an iterative method may be performed to select a single matching node in the first taxonomy 102a for some or all of the nodes of the second taxonomy 102b. For example, beginning at nodes of the second taxonomy 102b below those that were merged 402 previously, for each node the top M matches for that node may be scored 412. The process for scoring the top M matches may be as shown in FIG. 5. Once scores are calculated 412 for the top M matches for a current node of the second taxonomy, the scores may be evaluated to determine if any of the top M matching nodes are adequate matches. For example, any of the M matches having a score above a predetermined threshold may be deemed adequate. If there is an adequate node, than the adequate node with the highest score is selected 414 as a match for current node. The step of scoring 412 and selecting 414 an adequate match, if any, may be performed for each node at a given level of the second taxonomy 102b. If a node if found 416 to have descendants, then the method 400 descends 418 to the next level of the second taxonomy 102b and the steps of scoring 412 matches, selecting 414, and evaluating 416 the presence of descendent nodes may be repeat as described.

Once all levels have been subject to the steps 412, 414, then a correction step may be performed whereby matches may be broken 420 or otherwise deleted or ignored based on an evaluation of matchings of the children nodes of a node in the second taxonomy. For example, for some or all nodes in the second taxonomy, possibly excluding 402 merged nodes, each node ('current node') may be evaluated as follows: the child nodes of the current node and the node to which the current node was previously matched ('matched node') may be evaluated. If a significant portion (e.g. 80%, 90%, or some other N %) of the child nodes of the current node and the matched node were not also matched to one another, then the matching between the current node and the matched node may be broken 420. In some embodiments, only immediate children or grandchildren of the current node and matched node are evaluated, or some other limited number of levels. In others, all descendent nodes are evaluated.

The method 400 may further include evaluated 422 whether the merged taxonomy has converged 422. Convergence may be achieved where no new matchings exist after one or both of the match selection step 414 and the breaking step 420. If convergence is found, the method 400 may end. If not, then the method may repeat at step 412 starting with the level of the second taxonomy for which there are unmatched nodes.

FIG. 5 illustrates a method 500 for scoring 412 the M matches of a current node of the second taxonomy 102b in the context of the method 400. Part of the score for a match may be the Jaccard distance according to (2) already calculated for the top M nodes when identifying 410 the top M matches. Accordingly, the method 500 may include calculating 502 a Jaccard distance according to (2) or using the previously calculated Jaccard distance for the top M matches. The method 500 may further include calculating 504 a string edit distance for some or all of the top M matches. The string edits distance may be calculated 504 according to any methods for calculating this metric known in the art.

The method 500 may also include calculating a category depth score 506 for each of the top M matches for the current node. For example, for a selected node of the top M matches, the category depth score may indicate how deep in the merged hierarchy the current node and selected node have a common node. For example, the category depth score may be calculated 506 according to $S_{c,max} = \max(S_c, N_c/(N_T-1))$. Either of the second node may have multiple lineages in some taxonomies that are not constrained to be a strict tree (e.g. a directed acyclic graph (DAG)). Accordingly, a common node between the current node and selected node can likewise have multiple lineages. Accordingly $S_{c,max}$ represents the largest value of $S_c = N_c/(N_T-1)$ for all common nodes in all possible lineages of the current and selected node, where $S_{c,max}$ is the category depth score for the selected node with respect to the current node, $N_c$ is the number of common nodes in the lineage of the selected node and current node in the merged taxonomy and $N_T$ is the total number of nodes between the selected node and the root node of the merged taxonomy.

The method 500 may additionally include calculating 508 a category lineage score for each node of the top M matches. The category lineage score calculates a quality of the common nodes in the lineages of a current node of the second taxonomy 102b and a selected node of the top M matches. In particular, the category lineage score increases with the size of the nodes that are common between the current node and the selected node, with the size of a common node proportion to the number of descendent nodes of the common nodes.

For example, a category lineage score may be calculated according to (3), where CScore is calculated according to (4). getDesc($C_i$) returns the number of descendent nodes for a given node $C_i$ and getRootDesc( ) returns the total number of nodes in the first taxonomy from the root of the taxonomy. As is apparent in (3) the value of Cscore is updated with different values of $Score_{C_i}$ proceeding down or up the hierarchy away from the root node with the value of Cscore updated according to $Score_{C_i}$ for each node that the selected node and current node have in common in the merged taxonomy.

$$Score_{C_i} = \frac{\frac{1}{getDesc(C_i)} - \frac{1}{getRootDesc()}}{\frac{1}{\log(100)} - \frac{1}{getRootDesc()}} \quad (3)$$

$$Cscore \mathrel{+}= Score_{C_i} - Cscore * Score_{C_i} \quad (4)$$

The effect of (3) and (4) is to generate a score that increases according to both the number of descendants of common nodes between a selected node and current node and the depth in the taxonomy of the common nodes.

The various scores may be combined to generate a final score for each node of the M identified matches for a current node in the second taxonomy 102b. For example, the scores may be weighted and summed according to (5). In some embodiments, less than all of these scores may be used.

$$Score = JaccardScore * JS_{WT} + CScore * CS_{WT} + CDepthScore * CD_{WT} + EditDisScore * ED_{WT} \quad (5)$$

Where Score is the score for a selected node of the M matches, Jaccard score is the JaccardScore for the selected node, CScore is the category lineage score for the selected node, CDepthScore is the category depth score (e.g. $S_{C,max}$) for the selected node, EditDisScore is the edit distance for the selected node, and the $JS_{WT}$, $CS_{WT}$, $CD_{WT}$, and $ED_{WT}$ are weightings applied to each of these scores. The weighting values may be calculated according to logistic regression for a test taxonomy or subset of the first and second taxonomies 102a, 102b.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for merging taxonomies comprising:
    initializing a merged taxonomy, by a computer system, by merging at least one node of a plurality of nodes of a second taxonomy to at least one node of a plurality of nodes of a first taxonomy, the merged taxonomy comprising the first taxonomy and the second taxonomy;
    merging, by the computer system, the second taxonomy into the merged taxonomy by, traversing the second taxonomy from below at least one top level of the second taxonomy toward a bottom of the second taxonomy and performing:
        comparing, by the computer system, one or more identifiers or titles of the at least one node of the plurality of nodes of the second taxonomy to one or more identifiers or titles of the at least one node of the plurality of nodes of the first taxonomy;
        comparing, by the computer system, one or more lineages of one or more unmerged nodes of the plurality of nodes of the second taxonomy in the merged taxonomy to one or more lineages of one or more nodes of the plurality of nodes of the first taxonomy; and
        merging, by the computer system, the at least one node of the plurality of nodes of the second taxonomy and the at least one node of the plurality of nodes of the first taxonomy in the merged taxonomy if the comparison of the one or more identifiers or titles of the at least one node of the plurality of nodes of the second taxonomy to the one or more identifiers or titles of the at least one node of the plurality of nodes of the first taxonomy and the comparison of the one or more lineages of the one or more unmerged nodes of the second taxonomy in the merged taxonomy to the one or more lineages of the one or more nodes of the plurality of nodes of the first taxonomy satisfy a threshold condition; and
    for each unmerged node of the plurality of nodes of the second taxonomy, hereinafter a current node of the plurality of nodes of the second taxonomy:
        filtering the plurality of nodes of the first taxonomy according to a Jaccard distance of titles thereof with respect to a title of the current node of the plurality of nodes of the second taxonomy to define a filtered set of nodes;
        calculating an edit distance between the current node of the plurality of nodes of the second taxonomy and each node of the filtered set of nodes;
        calculating a lineage score for each node of the filtered set of nodes according to a comparison of a lineage of the current node of the plurality of nodes of the second taxonomy in the merged taxonomy to lineages of nodes of the filtered set of nodes; and
        merging the current node of the plurality of nodes of the second taxonomy with a selected node of the filtered set of nodes if a combined score of the edit distance and the lineage score for the selected node is both:
            a greatest combined score for the nodes of the filtered set of nodes; and
            the combined score for the selected node of the filtered set of nodes satisfies a combined score threshold condition.

2. The method of claim 1, further comprising:
    reversing mergings between a node of the plurality of nodes of the second taxonomy and a node of the plurality of nodes of the first taxonomy for which one or more child nodes thereof are not consistently merged with one another.

3. The method of claim 1 further comprising repeatedly merging the second taxonomy and the first taxonomy until no comparisons of the one or more identifiers or titles of the at least one node of the plurality of nodes of the second taxonomy to the one or more identifiers or titles of the at least one node of the plurality of nodes of the first taxonomy and no comparisons of the one or more lineages of the one or more unmerged nodes of the plurality of nodes of the second taxonomy in the merged taxonomy to the one or more lineages one or more unmerged nodes of the plurality of nodes of the first taxonomy satisfy the threshold condition.

4. The method of claim 1, further comprising, for the current node of the plurality of nodes of the second taxonomy:
    calculating a category depth score for the current node and the selected node of the filtered set of nodes; and
    merging the current node with the selected node of the filtered set of nodes if a combined score of the edit distance, the lineage score, and the category depth score for the selected node of the filtered set of nodes is both:
        the greatest combined score for the nodes of the filtered set of nodes; and
        the combined score for the selected node of the filtered set of nodes satisfies the combined score threshold condition.

5. The method of claim 4, wherein the category depth score for the current node of the plurality of nodes of the second taxonomy and a given node of the filtered set of nodes is computed according to $N_c/(N_T-1)$, where Nc is a number of nodes in common of the one or more lineages of the current node of the plurality of nodes of the second taxonomy and the given node and $N_T$ is a total number of nodes in a lineage of either the current node of the plurality of nodes of the second taxonomy or the given node of the filtered set of nodes.

6. The method of claim 1, further comprising, for the current node of the plurality of nodes of the second taxonomy, calculating a quality score for each node of the filtered set of nodes by computing a quality of each common node between each node of the filtered set of nodes and the current node of the plurality of nodes of the second taxonomy.

7. The method of claim 6, wherein the quality score of each common node is dependent on a number of descendants of the common node in the first taxonomy.

8. The method of claim 6, wherein the quality score of each common node is dependent on a number of descendants of the common node and a depth of the common node in the first taxonomy.

9. The method of claim 1, wherein:
comparing the one or more identifiers or titles of the at least one node of the plurality of nodes of the second taxonomy to the one or more identifiers or titles of the at least one node of the plurality of nodes of the first taxonomy comprises:
computing a Jaccard distance, the Jaccard distance is a JaccardScore calculated as:

$$JaccardScore = \sqrt{\frac{common\_words\_idf}{queryidf + conceptidf - common\_words\_idf}} \times \frac{common\_words\_idf}{queryidf_i}$$

where queryidf and conceptidf are value of idf computed according to $$idf = \sum_{i=1}^{n} \log \frac{N}{docfreq(w_i) + 1},$$

where $w_i$ is a word in an identifier for a node in the second taxonomy for queryidf and a word in an identifier for a node in the first taxonomy for conceptidf, docfreq($w_i$) is a number of times that the word $w_i$, occurs in identifiers of nodes in the first taxonomy, n is a number of words in common in the identifier for the node in the second taxonomy for queryidf and for the node in the first taxonomy for conceptidf, and N is a number of concepts in the first taxonomy and where common_words_idf is a value of idf, and where $w_i$ includes common words to both the node in the second taxonomy and the node in the first taxonomy.

10. A computer system for merging taxonomies comprising one or more processors and one or more memory devices coupled to the one or more processors, the one or more memory devices storing executable code effective to cause the one or more processors to:
initialize a merged taxonomy by merging at least one node of a plurality of nodes of a second taxonomy to at least one node of a plurality of nodes of a first taxonomy, the merged taxonomy comprising the first taxonomy and the second taxonomy;
merge the second taxonomy into the merged taxonomy by, traversing the second taxonomy from below at least one top level of the second taxonomy toward a bottom of the second taxonomy and performing:
comparing, by the computer system, one or more identifiers or titles of the at least one node of the plurality of nodes of the second taxonomy to one or more identifiers or titles of the at least one node of the plurality of nodes of the first taxonomy;
comparing, by the computer system, one or more lineages of one or more unmerged nodes of the plurality of nodes of the second taxonomy in the merged taxonomy to one or more lineages of the plurality of nodes of the first taxonomy;
and
merging, by the computer system, the at least one node of the plurality of nodes of the second taxonomy and the at least one node of the plurality of nodes of the first taxonomy in the merged taxonomy if the comparison of the one or more identifiers or titles of the at least one node of the second taxonomy to the one or more identifiers or titles of the at least one node of the plurality of nodes of the first taxonomy and the comparison of the one or more lineages of the one or more unmerged nodes of the plurality of nodes of the plurality of nodes of the second taxonomy in the merged taxonomy to the one or more lineages of the one or more nodes of the plurality of nodes of the first taxonomy satisfy a threshold condition; and
for each unmerged node of the plurality of nodes of the second taxonomy, hereinafter a current node of the plurality of nodes of the second taxonomy:
filtering the plurality of nodes of the first taxonomy according to a Jaccard distance of titles thereof with respect to a title of the current node of the plurality of nodes of the second taxonomy to define a filtered set of nodes;
calculating an edit distance between the current node of the plurality of nodes of the second taxonomy and each node of the filtered set of nodes;
calculating a lineage score for each node of the filtered set of nodes according to a comparison of a lineage of the current node of the plurality of nodes of the second taxonomy in the merged taxonomy to lineages of nodes of the filtered set of nodes; and
merging the current node of the plurality of nodes of the second taxonomy with a selected node of the filtered set of nodes if a combined score of the edit distance and the lineage score for the selected node is both:
a greatest combined score for the nodes of the filtered set of nodes; and
the combined score for the selected node of the filtered set of nodes satisfies a combined score threshold condition.

11. The computer system of claim 10, wherein the executable code are further effective to cause the one or more processors to reverse mergings between a node of the plurality of nodes of the second taxonomy and a node of the plurality of nodes of the first taxonomy for which one or more child nodes thereof are not consistently merged with one another.

12. The computer system of claim 10, wherein the executable code are further effective to cause the one or more processors to repeatedly merge the second taxonomy and the first taxonomy until no comparisons of the one or more identifiers or titles of the at least one node of the plurality of nodes of the second taxonomy to the one or more identifiers the plurality of nodes of the first taxonomy and no comparisons of the one or more lineages of the one or more unmerged nodes of the plurality of nodes of the second taxonomy in the merged taxonomy to the one or more lineages of the one or more unmerged nodes of the plurality of nodes of the first taxonomy satisfy the threshold condition.

13. The computer system of claim 10, wherein the executable code are further effective to cause the one or more processors to:
for a current node of the plurality of nodes of the second taxonomy, calculate a category depth score for the current node and the selected node of the filtered set of nodes; and
merge the current node of the plurality of nodes of the second taxonomy with the selected node of the filtered set of nodes if a combined score of the edit distance, the lineage score, and the category depth score for the selected node of the filtered set of nodes is both:
the greatest combined score for the nodes of the filtered set of nodes; and the combined score for the selected node of the filtered set of nodes satisfies the combined score threshold condition.

14. The computer system of claim 13, wherein the category depth score for the current node of the plurality of nodes of the second taxonomy and a given node of the filtered set of nodes is computed according to $N_c/(N_T-1)$, where Nc is a number of nodes in common of the one or more lineages of the current node of the plurality of nodes of the second taxonomy and the given node and $N_T$ is a total number of nodes in a lineage of either the current node of the plurality of nodes of the second taxonomy or the given node of the filtered set of nodes.

15. The computer system of claim 10, wherein the executable code are further effective to cause the one or more processors to, for a current node of the plurality of nodes of the second taxonomy, calculate a quality score for each node of the plurality of nodes of the filtered set of nodes by computing a quality of each common node between each node of the plurality of nodes of the filtered set of nodes and the current node of the plurality of nodes of the second taxonomy.

16. The computer system of claim 15, wherein the quality score of each common node is dependent on at least one of a number of descendants of the common node in the first taxonomy and a depth of the common node in the first taxonomy.

17. The computer system of claim 15, wherein the quality score of each common node is dependent on a number of descendants of the common node in the first taxonomy.

18. The computer system of claim 10, wherein:
comparing the one or more identifiers or titles of the at least one node of the plurality of nodes of the second taxonomy to the one or more identifiers or titles of the at least one node of the plurality of nodes of the first taxonomy comprises:
computing a Jaccard distance, the Jaccard distance is a JaccardScore calculated as:

$$JaccardScore = \sqrt{\frac{common\_words\_idf}{queryidf + conceptidf - common\_words\_idf}} \times \frac{common\_words\_idf}{queryidf_i}$$

where queryidf and conceptidf are value of idf computed according to $$idf = \sum_{i=1}^{n} \log\frac{N}{docfreq(w_i) + 1},$$

where $w_i$ is a word in an identifier for a node in the second taxonomy for queryidf and an a word in an identifier for a node in the first taxonomy for conceptidf, $docfreq(w_i)$ is a number of times that the word $w_i$, occurs in identifiers of nodes in the first taxonomy, n is a number of words in common in the identifier for the node in the second taxonomy for queryidf and for the node in the first taxonomy for conceptidf, and N is a number of concepts in the first taxonomy and where common_words_idf is a value of idf, and where $w_i$ includes common words to both the node in the second taxonomy and the node in the first taxonomy.

19. A method for merging taxonomies comprising:
initializing a merged taxonomy, by a computer system, by merging at least one node of a plurality of nodes of a second taxonomy to at least one node of a plurality of nodes of a first taxonomy, the merged taxonomy comprising the first taxonomy and the second taxonomy;
merging, by the computer system, the second taxonomy into the merged taxonomy by, traversing the second taxonomy from below at least one top level of the second taxonomy toward a bottom of the second taxonomy and performing:
comparing, by the computer system, one or more identifiers or titles of the at least one node of the plurality nodes of the second taxonomy to one or more identifiers or titles of the at least one node of the plurality of nodes of the first taxonomy, and wherein such comparing comprises computing a Jaccard distance, the Jaccard distance is a JaccardScore calculated as $$JaccardScore = \sqrt{\frac{common\_words\_idf}{queryidf + conceptidf - common\_words\_idf}} \times \frac{common\_words\_idf}{queryidf_i}$$

where queryidf and conceptidf are value of idf computed according to $$idf = \sum_{i=1}^{n} \log\frac{N}{docfreq(w_i) + 1},$$

where $w_i$ is a word in an identifier for a node in the second taxonomy for queryidf and an a word in an identifier for a node in the first taxonomy for conceptidf, $docfreq(w_i)$ is a number of times that the word $w_i$, occurs in identifiers of nodes in the first taxonomy, n is a number of words in common in the identifier for the node in the second taxonomy for queryidf and for the node in the first taxonomy for conceptidf, and N is a number of concepts in the first taxonomy and where common_words_idf is a value of idf, and where $w_i$ includes common words to both the node in the second taxonomy and the node in the first taxonomy;
comparing, by the computer system, one or more lineages of one or more unmerged nodes of the plurality of nodes of the second taxonomy in the merged taxonomy to one or more lineages of one or more nodes of the plurality of nodes of the first taxonomy; and
merging, by the computer system, the at least one node of the plurality of nodes of the second taxonomy and the at least one node of the plurality of nodes of the first taxonomy in the merged taxonomy if the comparison of the one or more identifiers or titles of the at least one node of the plurality of nodes of the second taxonomy to the one or more identifiers or titles of the at least one node of the plurality of nodes of the first taxonomy and the comparison of the one or more lineages of the one or more unmerged nodes of the plurality of nodes of the second taxonomy in the merged taxonomy to the one or more lineages of the one or more nodes of the first taxonomy satisfy a threshold condition.

20. The method of claim 19, wherein values of docfreq(wi) are retrieved from a precompiled index for the first taxonomy.

21. A computer system for merging taxonomies comprising one or more processors and one or more memory devices coupled to the one or more processors, the one or more memory devices storing executable code effective to cause the one or more processors to:

initialize a merged taxonomy by merging at least one node of a plurality of nodes of a second taxonomy to at least one node of a plurality of nodes of a first taxonomy, the merged taxonomy comprising the first taxonomy and the second taxonomy;

merge the second taxonomy into the merged taxonomy by, traversing the second taxonomy from below at least one top level of the second taxonomy toward a bottom of the second taxonomy and performing:

comparing, by the computer system, one or more identifiers or titles of the plurality of nodes of the second taxonomy to one or more identifiers or titles of the plurality of nodes of the first taxonomy, and wherein comparing one or more identifiers or titles of the plurality of nodes of the second taxonomy to the one or more identifiers or titles of the plurality of nodes of the first taxonomy comprises computing a Jaccard distance, the Jaccard distance is a JaccardScore calculated as $$JaccardScore = \sqrt{\frac{common\_words\_idf}{queryidf + conceptidf - common\_words\_idf} * \frac{common\_words\_idf}{queryidf_i}}$$

where queryidf and conceptidf are value of idf computed according to $$idf = \sum_{i=1}^{n} \log \frac{N}{docfreq(w_i) + 1},$$

where $w_i$ is a word in an identifier for a node in the second taxonomy for queryidf and an a word in an identifier for a node in the first taxonomy for conceptidf, docfreq($w_i$) is a number of times that the word $w_i$, occurs in identifiers of nodes in the first taxonomy, n is a number of words in common in the identifier for the node in the second taxonomy for queryidf and for the node in the first taxonomy for conceptidf, and N is a number of concepts in the first taxonomy and where common_words_idf is a value of idf, and where $w_i$ includes common words to both the node in the second taxonomy and the node in the first taxonomy;

comparing, by the computer system, one or more lineages of unmerged nodes of the plurality of nodes of the second taxonomy in the merged taxonomy to one or more lineages of the plurality of nodes of the first taxonomy;

and merging, by the computer system, the at least one node of the plurality of nodes of the second taxonomy and the at least one node of the plurality of nodes of the first taxonomy in the merged taxonomy if the comparison of the one or more identifiers or titles of the plurality of nodes of the second taxonomy to the one or more identifiers or titles of the plurality of nodes of the first taxonomy and the comparison of the one or more lineages of unmerged nodes of the second taxonomy in the merged taxonomy to the one or more lineages of the plurality of nodes the first taxonomy satisfy a threshold condition.

22. The computer system of claim 21, wherein values of docfreq($w_i$) are retrieved from a precompiled index for the first taxonomy.

* * * * *